US009025964B2

(12) United States Patent
Suehiro

(10) Patent No.: US 9,025,964 B2
(45) Date of Patent: May 5, 2015

(54) RECEIVER, DATA IDENTIFYING AND REPRODUCING APPARATUS, PON SYSTEM, AND DATA IDENTIFYING AND REPRODUCING METHOD

(75) Inventor: Takeshi Suehiro, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 90 days.

(21) Appl. No.: 13/701,740

(22) PCT Filed: Jun. 4, 2010

(86) PCT No.: PCT/JP2010/059538
§ 371 (c)(1),
(2), (4) Date: Dec. 3, 2012

(87) PCT Pub. No.: WO2011/151922
PCT Pub. Date: Dec. 8, 2011

(65) Prior Publication Data
US 2013/0077971 A1    Mar. 28, 2013

(51) Int. Cl.
*H04B 10/00*    (2013.01)
*H04J 14/00*    (2006.01)
(Continued)

(52) U.S. Cl.
CPC .......... *H04Q 11/0067* (2013.01); *H04L 7/0331* (2013.01); *H04B 10/272* (2013.01); *H04B 10/69* (2013.01)

(58) Field of Classification Search
CPC ...... H04B 10/695; H04B 10/69; H04B 10/66; H04B 10/60; H04B 10/691; H04B 10/272; H04L 7/0331; H04L 7/0012; H04Q 11/0067
USPC ............... 398/52, 202–214, 66–73, 154–155; 375/354–376; 370/442
See application file for complete search history.

(56) References Cited

U.S. PATENT DOCUMENTS 4,669,092 A * 5/1987 Sari et al. ...................... 375/232
6,262,611 B1 * 7/2001 Takeuchi ...................... 327/159
(Continued)

FOREIGN PATENT DOCUMENTS

CN   1496557 A    5/2004
JP   2005-151424 A    6/2005
(Continued)

OTHER PUBLICATIONS

Tagami et al, A study of clock and data recovery with composite structure of oversampling and gated oscillator for 10Gbits subscriber network, 2009, IEICE Electronics Express, vol. 6 No. 5, pp. 264-269.*

(Continued)

*Primary Examiner* — Ken Vanderpuye
*Assistant Examiner* — Dibson Sanchez
(74) *Attorney, Agent, or Firm* — Oblon, McClelland, Maier & Neustadt, L.L.P.

(57) ABSTRACT

An OLT that receives a signal in which transmission signals having a plurality of transmission rates are time-division multiplexed, as a received signal, and performs data reproduction by selecting reproduction data to be reproduced, among oversampled signals obtained by oversampling the received signal. The OLT includes a data-signal-information acquisition unit that acquires a transmission rate of a received signal targeted for a process of the data reproduction, a sampling frequency control unit that determines a sampling frequency to be used for the oversampling based on the transmission rate, and a sampling-clock generation unit that generates a clock signal having the sampling frequency determined by the sampling-frequency control unit, and performs the oversampling based on the clock signal.

12 Claims, 5 Drawing Sheets

(51) Int. Cl.
  *H04L 7/00*      (2006.01)
  *H04Q 11/00*     (2006.01)
  *H04L 7/033*     (2006.01)
  *H04B 10/272*    (2013.01)
  *H04B 10/69*     (2013.01)

(56) References Cited

U.S. PATENT DOCUMENTS

| | | | |
|---|---|---|---|
| 6,285,722 B1 * | 9/2001 | Banwell et al. | 375/354 |
| 6,765,975 B2 * | 7/2004 | Dunning et al. | 375/371 |
| 7,039,327 B2 * | 5/2006 | Kim et al. | 398/202 |
| 7,076,177 B1 * | 7/2006 | Yang et al. | 398/208 |
| 7,583,898 B1 * | 9/2009 | Dalton et al. | 398/100 |
| 7,653,312 B2 * | 1/2010 | Mori | 398/100 |
| 7,684,531 B2 * | 3/2010 | Masui et al. | 375/355 |
| 7,917,032 B2 * | 3/2011 | Mori | 398/72 |
| 7,924,076 B2 * | 4/2011 | Suzuki et al. | 327/159 |
| 8,005,370 B2 * | 8/2011 | Perez | 398/155 |
| 8,027,586 B2 * | 9/2011 | Ikeda et al. | 398/70 |
| 8,139,950 B2 * | 3/2012 | Niibe et al. | 398/168 |
| 8,145,055 B2 * | 3/2012 | Niibe et al. | 398/25 |
| 8,179,879 B2 * | 5/2012 | Ivry | 370/350 |
| 8,477,800 B2 * | 7/2013 | Kazawa et al. | 370/441 |
| 2002/0027695 A1 * | 3/2002 | Kim et al. | 359/189 |
| 2003/0007224 A1 * | 1/2003 | Yamashita et al. | 359/189 |
| 2003/0190006 A1 * | 10/2003 | Nagano | 375/376 |
| 2004/0258410 A1 * | 12/2004 | Yajima et al. | 398/71 |
| 2006/0133809 A1 * | 6/2006 | Chow et al. | 398/66 |
| 2006/0268969 A1 * | 11/2006 | Kimura et al. | 375/225 |
| 2007/0064850 A1 * | 3/2007 | Tamura | 375/355 |
| 2007/0160371 A1 * | 7/2007 | Irie | 398/43 |
| 2008/0050116 A1 * | 2/2008 | Nakaishi et al. | 398/43 |
| 2008/0225898 A1 * | 9/2008 | DeLew et al. | 370/503 |
| 2009/0010650 A1 * | 1/2009 | Tsuchiya et al. | 398/59 |
| 2009/0034964 A1 * | 2/2009 | Sakai et al. | 398/17 |
| 2009/0245790 A1 * | 10/2009 | Mizutani et al. | 398/43 |
| 2010/0119240 A1 * | 5/2010 | Feng | 398/202 |
| 2011/0311221 A1 * | 12/2011 | Mukai et al. | 398/25 |
| 2012/0008948 A1 * | 1/2012 | Kazawa et al. | 398/58 |

FOREIGN PATENT DOCUMENTS

| | | |
|---|---|---|
| JP | 2008 78760 | 4/2008 |
| JP | 2008-172665 | 7/2008 |
| WO | 2009 069205 | 6/2009 |

OTHER PUBLICATIONS

IEEE 802.3av, "IEEE Standard for Information technology—Telecommunications and information exchange between systems—Local and metropolitan area networks—Specific requirements," IEEE Computer Society, pp. 1-214 (2009).
International Search Report Issued Jul. 13, 2010 in PCT/JP10/59538 Filed Jun. 4, 2010.
Office Action issued Apr. 16, 2014 in Korean Patent Application No. 10-2013-7000069 (with English translation).
Office Action issued Jun. 25, 2013, in Japanese Patent Application No. 2012-518196 with Partial English translation.
Combined Office Action and Search Report issued Sep. 11, 2014 in Patent Application No. 201080067191.3.

* cited by examiner

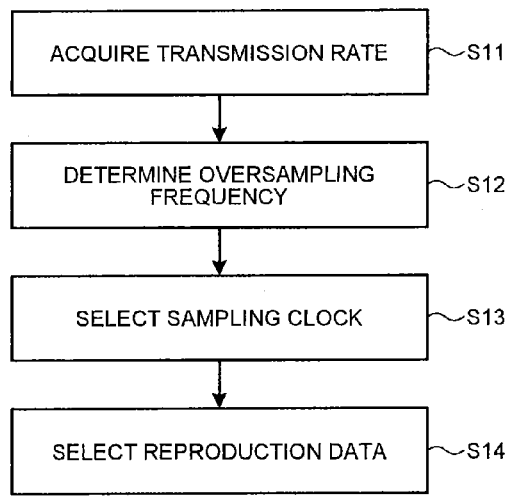
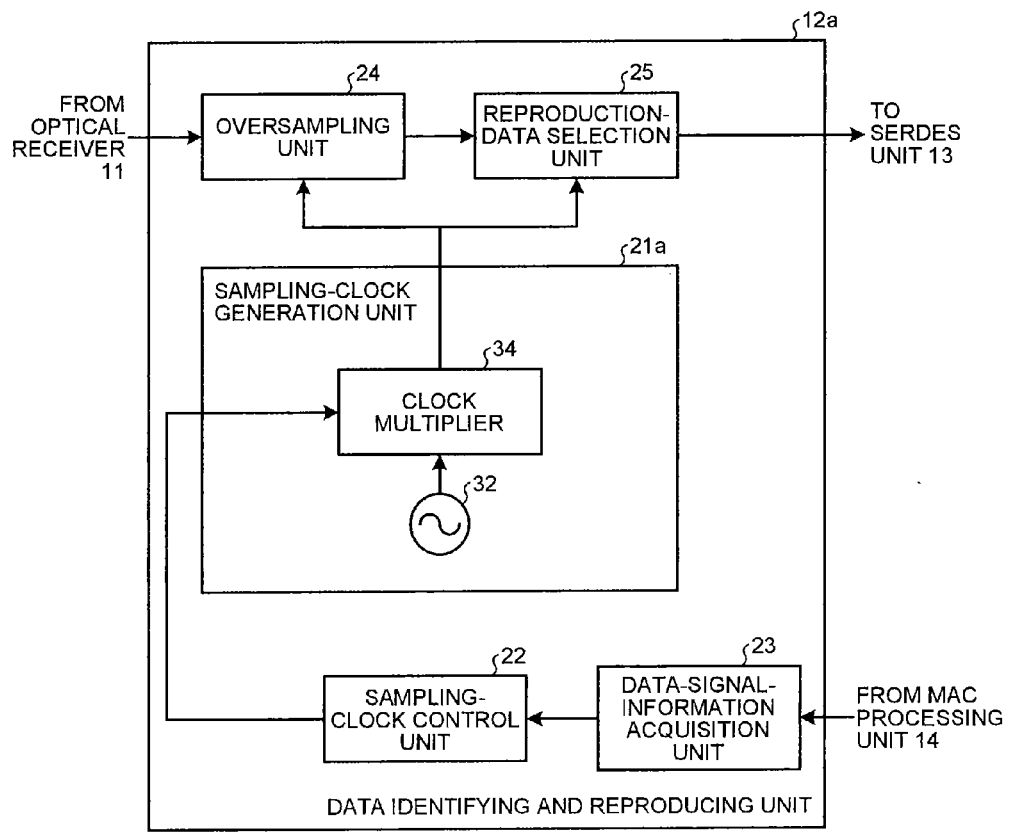

RECEIVER, DATA IDENTIFYING AND REPRODUCING APPARATUS, PON SYSTEM, AND DATA IDENTIFYING AND REPRODUCING METHOD

FIELD

The present invention relates to a receiver, a data identifying and reproducing apparatus, a PON system, and a data identifying and reproducing method.

BACKGROUND

In a PON (Passive Optical Network) system, data signals having different transmission rates can be time-division multiplexed. For example, in Non Patent Literature 1 mentioned below, the standard for a 10G-EPON (Ethernet® PON) that realizes a transmission rate of 10.3 Gbps is specified so as to be coexistent with a GE-PON having a transmission rate of 1.25 Gbps.

There have been considered various techniques for data identification and reproduction of a signal in which data signals having different transmission rates are time-division multiplexed. Patent Literature 1 mentioned below discloses a technique regarding a multi-rate receiver that performs data identification and reproduction by performing oversampling using a sampling clock having a frequency of at least m times (m≥2) as high as a desired transmission rate of a plurality of transmission rates (hereinafter, "multi-rate") of a received signal, and selecting reproduction data.

CITATION LIST

Patent Literature

Patent Literature 1: Japanese Patent Application Laid-open No. 2008-78760

Non Patent Literature

Non Patent Literature 1: IEEE 802. 3av-2009

SUMMARY

Technical Problem

However, in the multi-rate receiver described in Patent Literature 1, the multi-rate receiver is realized by using a sampling clock having a frequency of at least m times as high as one desired transmission rate of multi rates. Therefore, for one multi-rate receiver to implement data identification and reproduction for a plurality of desired transmission rates, it is required to use a frequency of at least m times as high as the fastest transmission rate of the desired plural transmission rates. Accordingly, the frequency of at least m times as high as the fastest transmission rate is used even at the time of performing data identification and reproduction of a data signal having a smaller transmission rate than the fastest transmission rate, and so as a result of using a sampling clock of a frequency higher than necessary, power consumption may be wasted.

The present invention has been achieved in view of the above-mentioned circumstances, and an object of the present invention is to provide a receiver, a data identifying and reproducing apparatus, a PON system, and a data identifying and reproducing method, which can perform data identification and reproduction for a plurality of transmission rates while minimizing power consumption, in the case of receiving data signals having different transmission rates.

Solution to Problem

In order to solve the above-mentioned problems and achieve the object, the present invention provides a receiver that receives a signal in which transmission signals having a plurality of transmission rates are time-division multiplexed, as a received signal, and performs data identification and reproduction by selecting reproduction data to be reproduced, among oversampled signals obtained by oversampling the received signal, wherein the receiver comprises: a transmission-rate acquisition unit that acquires a transmission rate of a received signal targeted for a process of the data identification and reproduction; a sampling-frequency control unit that determines a sampling frequency to be used for the oversampling based on the transmission rate; and a sampling-clock generation unit that generates a clock signal having the sampling frequency determined by the sampling-frequency control unit, and performs the oversampling based on the clock signal.

Advantageous Effects of Invention

The receiver according to the present invention can advantageously perform data identification and reproduction for a plurality of transmission rates while minimizing power consumption, in the case of receiving data signals having different transmission rates.

BRIEF DESCRIPTION OF DRAWINGS

FIG. 5 is a chart showing one example of a data identifying and reproducing procedure according to the first embodiment.

FIG. 6 is a diagram showing a configurational example of a data identifying and reproducing unit according to a second embodiment.

DESCRIPTION OF EMBODIMENTS

Embodiments of a receiver, a data identifying and reproducing apparatus, a PON system and a data identifying and reproducing method according to the present invention will be described below in detail with reference to the drawings. The present invention is not limited to the embodiments.

First Embodiment

Figure 1:
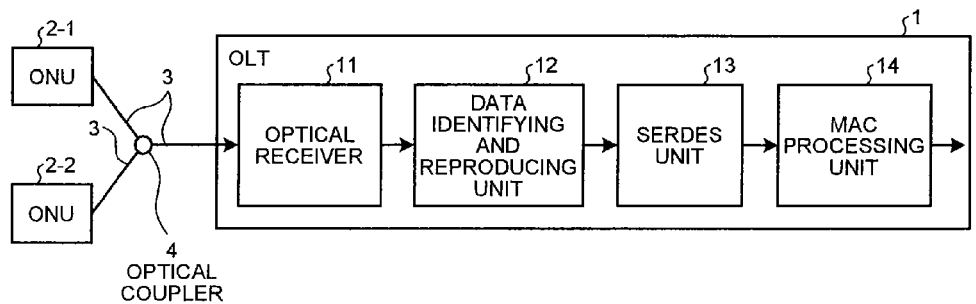
FIG. 1 is a diagram showing a configurational example of a PON system according to a first embodiment.

FIG. 1 is a diagram showing a configurational example of a PON system according to a first embodiment of the present invention. As shown in FIG. 1, the PON system according to the present embodiment is composed of terminal side devices (ONUs: Optical Network Units) 2-1 and 2-2 connected to a subscriber terminal, and a station side device (OLT: Optical Line Terminal) 1. The ONUs 2-1 and 2-2 and the OLT 1 are connected by an optical coupler 4 and an optical fiber 3. In FIG. 1, the number of ONUs is two (ONUs 2-1, 2-2), but the number of ONUs connected to the OLT 1 is not limited thereto, and any number of ONUs can be applied.

The ONU 2-1 transmits a data signal to the OLT 1 at a transmission rate of 1 Gbps, and the ONU 2-2 transmits a data signal to the OLT 1 at a transmission rate of 2 Gbps. The data signal transmitted by the ONU 2-1 and the data signal transmitted by the ONU 2-2 are time-division multiplexed and inputted to the OLT 1.

The OLT 1 subjects data signals from the ONU 2-1 and the ONU 2-2, that is, data signals having the two classes of transmission rates of 1 Gbps and 2 Gbps to data identification and reproduction based on oversampling and reproduction data selection. The OLT 1 includes: an optical receiver 11 that converts the data signals transmitted from the ONU 2-1 and the ONU 2-2 via the optical fiber 3 and the optical coupler 4 into electric signals; a data identifying and reproducing unit 12 that subjects the electric signals converted by the optical receiver 11 to identification and reproduction; a SERDES (SERializer/DESerializer) unit 13 that performs serial-parallel conversion of serial data signals reproduced by the data identifying and reproducing unit 12 to generate parallel data; and a MAC (Media Access Control) processing unit 14 that sets the parallel data generated by the SERDES unit 13 as a data frame, performs identification processing of a data frame, and controls a time-division multiple access of the ONU 2-1 and the ONU 2-2.

In FIG. 1, as a constituent element of the OLT 1, only a function related to uplink communication (communication from the ONU 2-1 and the ONU 2-2 to the OLT 1) is shown. For downlink communication, similar processing to that of a conventional OLT is performed.

The MAC processing unit 14 has a function as a timing control unit that controls transmission and reception timings in the PON system. Specifically, when there are data transmission requests from the ONUs 2-1 and 2-2, the MAC processing unit 14 determines periods of time during which transmission permission is granted to the respective ONUs 2-1 and 2-2 based on the transmission requests, and notifies the ONUs 2-1 and 2-2 of the determined periods of time. The ONUs 2-1 and 2-2 transmit data signals in time windows permitted based on the transmission permission from the OLT 1, respectively. Because the data signal transmitted from the ONU 2-1 and the data signal transmitted from the ONU 2-2 are time-division multiplexed, the time windows in which the transmission permission is granted to the ONU 2-1 and the ONU 2-2 by the MAC processing unit 14 become different from each other. Because the MAC processing unit 14 performs the control described above, the MAC processing unit 14 can recognize which ONU has transmitted the data signal received by the its apparatus, based on the period of time for which the MAC processing unit 14 has granted the permission of transmission.

Figure 2:
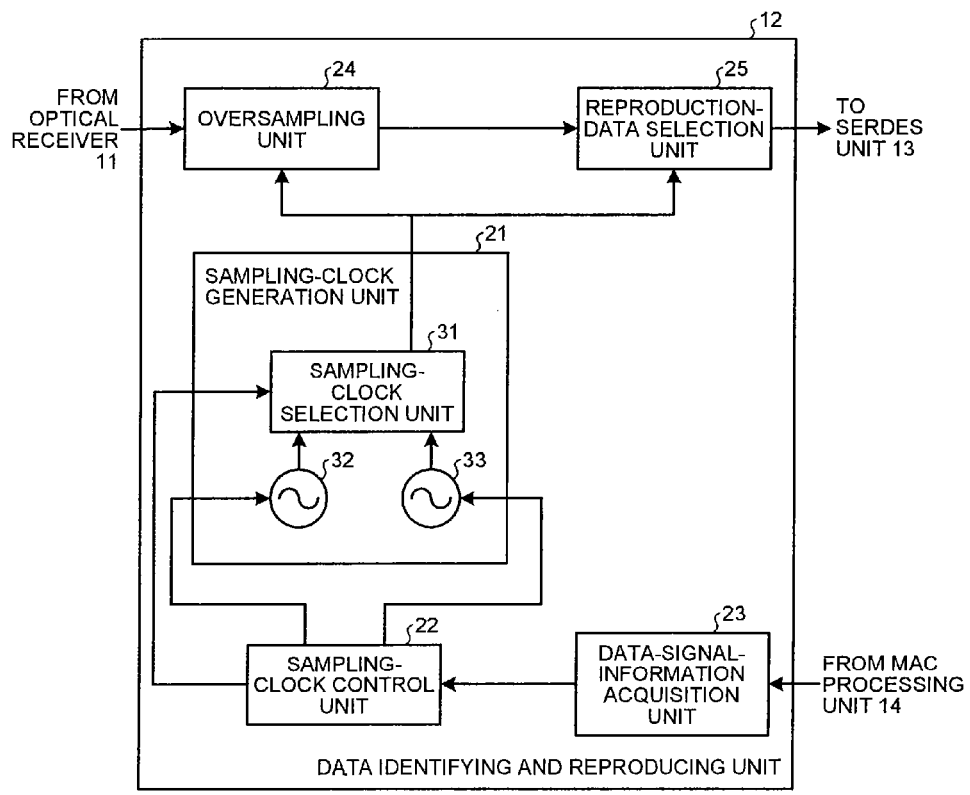
FIG. 2 is a diagram showing a configurational example of a data identifying and reproducing unit according to the first embodiment.

FIG. 2 is a diagram showing a configurational example of the data identifying and reproducing unit 12. As shown in FIG. 2, the data identifying and reproducing unit 12 according to the present embodiment includes a sampling-clock generation unit 21, a sampling-clock control unit 22, a data-signal-information acquisition unit (transmission-rate acquisition unit) 23, an oversampling unit 24, and a reproduction-data selection unit 25. The sampling-clock generation unit 21 includes a sampling-clock selection unit (clock selection unit) 31, a 3-GHz clock generation unit 32, and a 6-GHz clock generation unit 33.

Data identification and reproduction based on oversampling and data reproduction selection, which is performed by the data identifying and reproducing unit 12 according to the present embodiment, is now explained. To reproduce transmitted data from a received signal, bit synchronization needs to be achieved. For example, as a method of bit synchronization, positions of a rising edge and a falling edge of a signal are detected, and a point close to the middle between these positions (a point far from the positions of the rising edge and the falling edge) is determined as a sampling point. At this time, in order to detect the rising edge and the falling edge of the signal, it is necessary to use a signal sampled at a frequency higher than a transmission rate (an oversampled signal).

Figure 3:
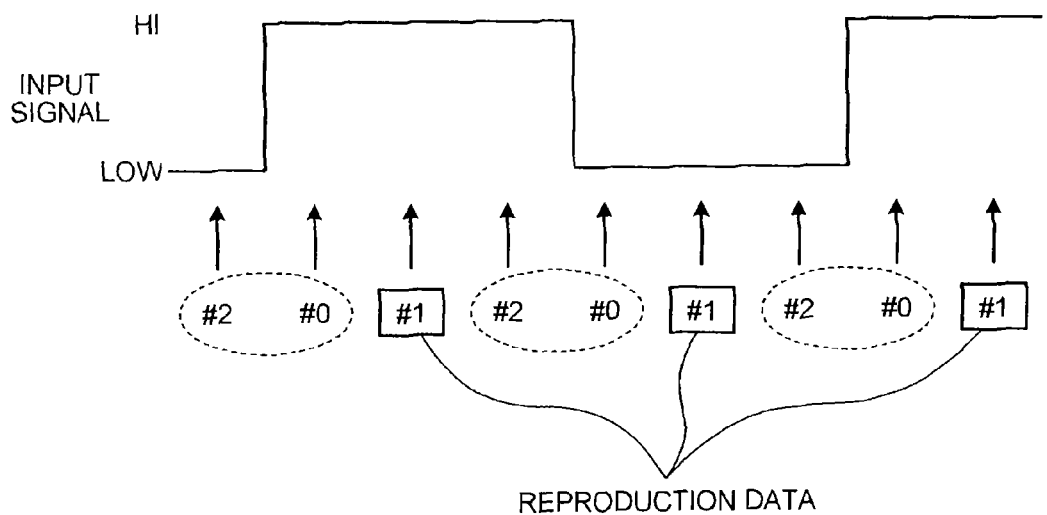
FIG. 3 is a chart showing a concept of oversampling points and reproduction data selection.

FIG. 3 is a chart showing a concept of oversampling points and reproduction data selection in data identification and reproduction based on oversampling and data reproduction selection. An input signal (received signal) inputted to the data identifying and reproducing unit 12 has a value of HI (High) or LOW. Sampling points after the input signal is oversampled are shown below the input signal. In this case, three times oversampling is performed, and three sampling points of #0, #1, and #2 are generated with respect to a sampling point of one input data piece (before the oversampling). In the example of FIG. 3, because there is a changing point of the data (a change from LOW to HI, a change from HI to LOW) between #2 and #0, it can be estimated that there are a rising edge and a falling edge of the signal between #2 and #0. In this case, if a sampling point #1 away from these changing points is selected for reproduction data, then transmission data can be reproduced correctly. As for what multiplication factor is to be set for an oversampling ratio is determined in dependence upon an envisaged distortion degree of the input signal (a fluctuation quantity of its signal waveform in a direction of a time axis) or the like.

In the present embodiment, to receive a data signal having two classes of transmission rates of 1 Gbps and 2 Gbps, there is provided the sampling-clock generation units (the 3-GHz clock generation unit 32 and the 6-GHz clock generation unit 33) that generates clock signals having oversampling frequencies corresponding to these two transmission rates, respectively. Herein, a jitter amount, which is the fluctuation quantity of a signal waveform received in the direction of the time axis, is temporarily set to 0.5 (that is a jitter amount when a time required for transmitting 1 bit is 1), and a frequency of the sampling clock is three times as high as each transmission rate. To this end, the 3-GHz clock generation unit 32 that generates a clock (clock signal) of 3 GHz and the 6-GHz clock generation unit 33 that generates a clock of 6 GHz are provided. In this case, a frequency of the sampling clock is three times as high as each transmission rate, but it is enough that the ratio of the frequency of the sampling clock to the transmission rate is set taking the jitter amount or the like into consideration, and the ratio is not limited to three times, and any multiplication factor can be used.

A data identifying and reproducing method according to the present embodiment is explained next. The OLT 1 first acquires transmission rates used for transmission by the ONU 2-1 and the ONU 2-2. In this case, their transmission rates are acquired based on notification from the ONU 2-1 and the ONU 2-2.

Figure 4:
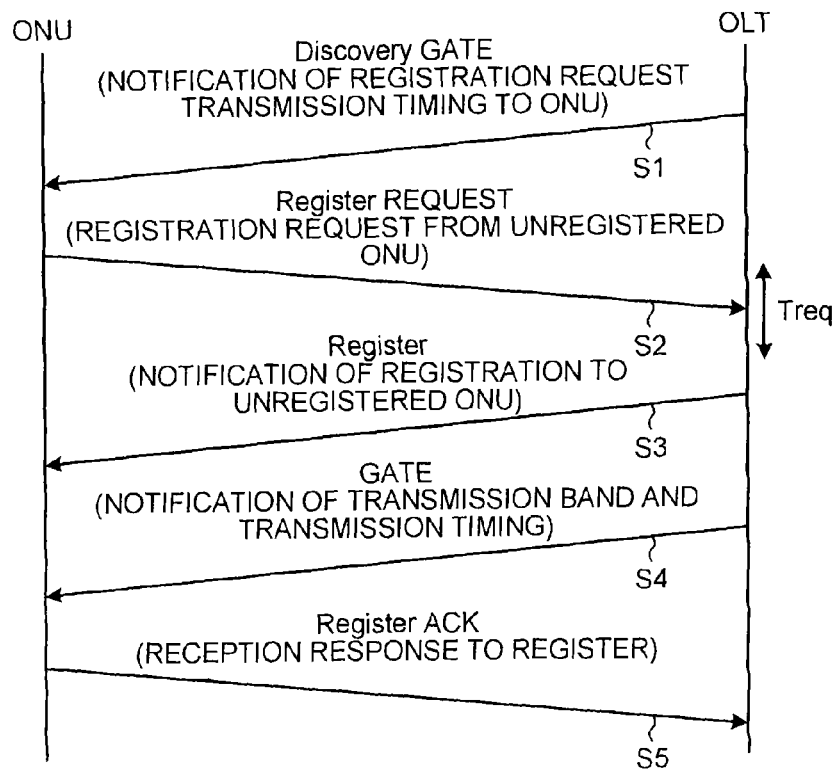
FIG. 4 is a chart showing one example of an acquiring procedure of a transmission rate according to the first embodiment.

FIG. 4 is a chart showing one example of a transmission-rate acquiring procedure. In the PON system, when an ONU is newly connected to the OLT, the following connecting procedure is performed to enable communications. In the process of the connecting procedure, the OLT 1 recognizes a transmission rate of each ONU.

First, the OLT 1 transmits a signal referred to as "Discovery GATE" to each ONU at a predetermined interval (Step S1). The Discovery GATE includes transmission rates at which the OLT 1 can receive a signal. The Discovery GATE also includes a time Treq for which a Register REQUEST (a registration request), which is a next procedure (a time for which the Register REQUEST is permitted to be transmitted to the ONU), is received in addition to the transmission rates.

The ONUs 2-1 and 2-2 having received the Discovery GATE return a Register REQUEST to the OLT1 within a time window of Treq (Step S2). The Register REQUEST includes a transmission rate at which the own device (ONU 2-1, 2-2) can transmit a signal and a transmission rate to be registered (a transmission rate to be used for transmission of a data signal).

The OLT 1 having received the Register REQUEST returns a Register (a registration notification) (Step S3) to a transmission source ONU (the ONU 2-1 or 2-2), and transmits a GATE for making notification of the next transmission-permitted time window thereto (Step S4). The ONU having received the Register returns a Register ACK (a response to the Register) within the permitted transmission time window (Step S5). Communications between the OLT 1 and the ONUs 2-1 and 2-2 become possible by these steps.

As described above, the transmission rate is acquired from each ONU in the process of the connecting procedure. However, the present invention is not limited thereto, and the transmission rate may be acquired by other methods. For example, the ONU is separately requested to acquire the transmission rate and it is acquired from the ONU, or in the case where the transmission rate to be used for transmission by the ONU can be changed or the other case like that, the ONU communicates a changed transmission rate to the OLT 1 before the change of the transmission rate. The above connecting procedure is performed by the MAC processing unit 14 of the OLT 1, and the MAC processing unit 14 holds the acquired transmission rates of the respective ONUs. That is, the MAC processing unit 14 functions as a transmission-information acquisition unit that acquires the transmission rate from each ONU, which is a transmission source of a data signal. In this case, the MAC processing unit 14 functions as the transmission-information acquisition unit, but a transmission-information acquisition unit may be provided apart from the MAC processing unit 14, and the transmission-information acquisition unit may acquire a transmission rate from each ONU.

FIG. 5 is a chart showing one example of a data identifying and reproducing procedure of the present embodiment. As described above, the MAC processing unit 14 first acquires and holds the transmission rates. Because the MAC processing unit 14 recognizes the transmission time window of each ONU as described above, the MAC processing unit 14 can recognize which ONU transmits a data signal to be received later. The MAC processing unit 14 manages a reception time window estimated from the permitted transmission time window and a transmission rate corresponding thereto as data signal information for each received signal.

Next, the sampling-clock control unit 22 acquires a transmission rate by acquiring the data signal information from the MAC processing unit 14 (Step S11). The sampling-clock control unit 22 then determines a sampling frequency based on the data signal information (Step S12), and selects a sampling clock corresponding to the sampling frequency from the usable sampling clocks (Step S13). Specifically, the data-signal-information acquisition unit 23 acquires the data signal information from the MAC processing unit 14 and sets the data signal information to the sampling-clock control unit 22. For example, every time the transmission rate is changed, the MAC processing unit 14 makes notification of the next transmission rate as the data signal information a predetermined time before the time of the change. Alternatively, the MAC processing unit 14 may notify the sampling-clock control unit 22 of information about at which time and at which transmission rate each burst signal within the next allocated cycle arrives for each allocated cycle (including information of a period during which data transmission is not performed), as data signal information, or some other methods like that may be applied.

The sampling-clock control unit 22 recognizes a transmission rate of a signal to be received later based on the data signal information, determines the sampling frequency for oversampling for each burst signal based on the transmission rate, and selects a sampling clock corresponding to the sampling frequency from the usable sampling clocks. In this case, oversampling is performed by a factor of three times as high as the transmission rate, and 3 GHz is selected as the sampling clock when the transmission rate is 1 Gbps, and 6 GHz is selected as the sampling clock when the transmission rate is 2 Gbps.

When selecting 3 GHz as the sampling clock (when the transmission rate is 1 Gbps), the sampling-clock control unit 22 instructs the 3-GHz clock generation unit 32 to start up, instructs the 6-GHz clock generation unit 33 to stop its operation, and instructs the sampling-clock selection unit 31 to output a sampling clock inputted from the 3-GHz clock generation unit 32. When selecting 6 GHz as the sampling clock (when the transmission rate is 2 Gbps), the sampling-clock control unit 22 instructs the 6-GHz clock generation unit 33 to start up, instructs the 3-GHz clock generation unit 32 to stop its operation, and instructs the sampling-clock selection unit 31 to output a sampling clock inputted from the 6-GHz clock generation unit 33. Furthermore, when the transmission rate is 0 bps (when there is no signal to be received), the sampling-clock control unit 22 instructs the 3-GHz clock generation unit 32 and the 6-GHz clock generation unit 33 to stop their operations, and instructs the sampling-clock selection unit 31 to stop outputting a sampling clock.

Then, the oversampling unit 24 and the reproduction-data selection unit 25 perform data reproduction and selection processing of the received signal (Step S14). Specifically, the oversampling unit 24 performs oversampling of the received signal inputted from the optical receiver 11 using the sampling clock outputted from the sampling-clock selection unit 31, and outputs an oversampled signal (the sampling result) to the reproduction-data selection unit 25. The reproduction-data selection unit 25 selects reproduction data from the input sampling result, and outputs the reproduction data to the SERDES unit 13 using the sampling clock inputted from the sampling-clock selection unit 21.

In the present embodiment, the transmission rates handled by the OLT 1 are of two classes, and two classes of clock generation units are provided. However, when the transmission rates handled by the OLT 1 are m classes (m is an integer equal to or larger than 3), m classes of clock generation units may be provided. Furthermore, in the present embodiment, threefold oversampling is performed in both the case of the transmission rate being 1 Gbps and the case of the transmission rate being 3 Gbps, but the oversampling ratio may be made varied depending on the transmission rate.

As described above, in the present embodiment, a plurality of clock generation units (the 3-GHz clock generation unit 32 and the 6-GHz clock generation unit 33) are provided corresponding to the transmission rates. A transmission rate of a received signal is acquired from the MAC processing unit 14, to operate the clock generation unit corresponding to the sampling to be used for reproduction data selection based on the transmission rate, and to stop the operation of the clock generation unit, which is not used for the reproduction data selection. Therefore, an operation of a circuit for generating a sampling clock having a frequency exceeding a necessary frequency can be stopped, thereby enabling to minimize power consumption. Furthermore, when the transmission rate is 0 Gbps (when there is no received signal), power consumption can be further reduced by stopping operations of the clock generation unit and the sampling-clock selection unit 31.

Second Embodiment

FIG. 6 is a diagram showing a configurational example of a data identifying and reproducing unit 12a of an OLT according to a second embodiment of the present invention. The configuration of the OLT according to the present embodiment is identical to that of the OLT 1 according to the first embodiment, except for including a data identifying and reproducing unit 12a instead of the data identifying and reproducing unit 12 of the OLT 1 according to the first embodiment. The configuration of the PON system according to the present embodiment is identical to that of the PON system according to the first embodiment except for including the OLT according to the present embodiment instead of the OLT 1 according to the first embodiment. Constituent elements having functions identical to those in the first embodiment are denoted by like reference signs and explanations thereof will be omitted.

In the first embodiment, as for a plurality of possible sampling clocks (sampling clocks for oversampling), a sampling clock source that generates a sampling clock is provided for each sampling clock, so that a sampling clock source is selected depending on a transmission rate. On the contrary, in the present embodiment, only one sampling clock source of a sampling frequency corresponding to the lowest transmission rate of the possible transmission rates (hereinafter, "lowest sampling frequency") is provided, and a sampling clock generated by the sampling clock source is frequency-multiplied and used depending on the transmission rate.

As shown in FIG. 6, the data identifying and reproducing unit 12a according to the present embodiment is identical to the data identifying and reproducing unit 12 according to the first embodiment, except for including a sampling clock generation unit 21a instead of the sampling-clock generation unit 21. The sampling clock generation unit 21a includes the 3-GHz clock generation unit 32 similar to that of the first embodiment and a clock multiplier 34.

As with the first embodiment, it is assumed that a jitter amount is 0.5, and the frequency of the sampling clock is three times as high as each transmission rate. Also as with the first embodiment, the transmission rates used for transmission by the ONUs 2-1 and 2-2 are 1 Gbps and 2 Gbps, respectively. In this case, the lowest transmission rate is 1 Gbps, and a 3-Gbps sampling clock is required for performing three times oversampling. For this reason, in the configuration example shown in FIG. 6, there is provided the 3-GHz clock generation unit 32 that generates the sampling clock of 3 GHz as the lowest sampling frequency.

Figure 7:
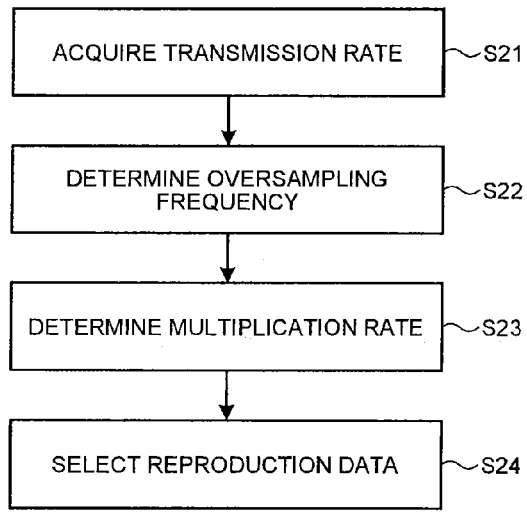
FIG. 7 is a chart showing one example of a data identifying and reproducing procedure according to the second embodiment.

A data identifying and reproducing method according to the present embodiment is explained next. FIG. 7 is a chart showing one example of the data identifying and reproducing procedure of the present embodiment. First, similarly to the first embodiment, the sampling-clock control unit 22 acquires the data signal information from the MAC processing unit 14 to acquire the transmission rate (Step S21).

The sampling-clock control unit 22 determines the sampling frequency (referred to as "oversampling frequency") for oversampling based on the acquired transmission rate (Step S22). In this case, because an oversampling ratio is three times, the frequency three times as high as the transmission rate is used as the oversampling frequency.

Then, the sampling-clock control unit 22 determines a ratio between the determined oversampling frequency and the lowest sampling frequency as a multiplication rate (Step S23), and notifies the clock multiplier 34 of the determined multiplication rate. When the transmission rate is 1 Gbps, the oversampling frequency is 3 GHz, which is the same frequency as that of the clock generated by the 3-GHz clock generation unit 32, and thus the multiplication rate is 1. When the transmission rate is 2 Gbps, the oversampling frequency is 6 GHz, which is the same frequency as that of the clock generated by the 3-GHz clock generation unit 32, and thus the multiplication rate is 2. When the transmission rate is 0 Gbps, the multiplication rate is 0. When the transmission rate is 0 Gbps, the sampling-clock control unit 22 notifies the clock multiplier 34 of the multiplication rate and instructs the 3-GHz clock generation unit 32 to stop its operation.

The clock multiplier 34 multiplies the clock inputted from the 3-GHz clock generation unit 32 based on the multiplication rate instructed by the sampling-clock control unit 22, and outputs the resultant clock to the oversampling unit 24 and the reproduction-data selection unit 25. Subsequently, similarly to the first embodiment, the oversampling unit 24 and the reproduction-data selection unit 25 subject the received signal to the data reproduction and selection process (Step S24). Operations other than those in the present embodiment described above are identical to corresponding ones of the first embodiment.

In the present embodiment, the oversampling ratios of 1-Gbps and 2-Gbps data signals are the same, but the oversampling ratio may be changed for each transmission rate. In the present embodiment, a case of having two classes of transmission rates has been explained. However, when there are three or more classes of transmission rates, it is enough that the multiplication rate is determined based on the transmission rate and the oversampling ratio as with the former case.

As described above, in the present embodiment, one sampling clock source that generates the sampling frequency corresponding to the lowest transmission rate of the possible transmission rates is provided to generate a sampling clock obtained by multiplying the lowest sampling frequency based on the transmission rate of the received signal. Therefore, sampling does not need to be performed with a frequency exceeding the required frequency, thereby enabling to minimize power consumption. Furthermore, when the transmission rate is 0 Gbps (when there is no received signal), power consumption can be further reduced by stopping operations of the clock generation unit and the sampling-clock selection unit 31.

Third embodiment.

Figure 8:
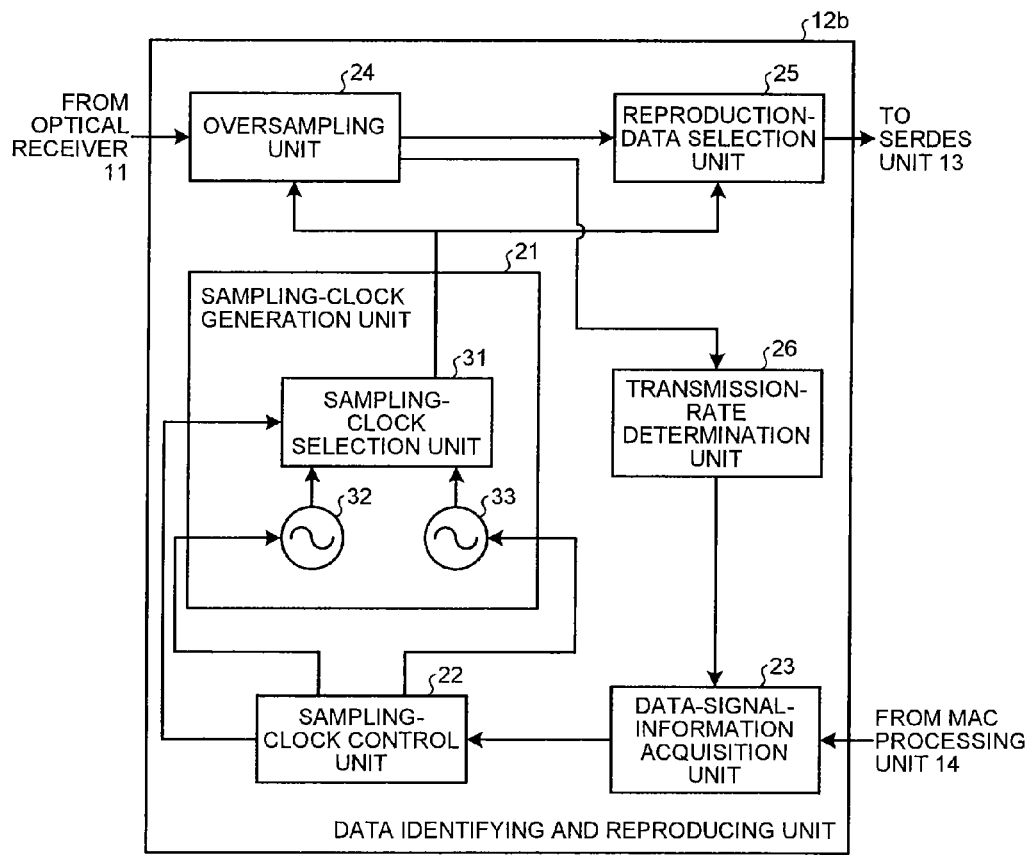
FIG. 8 is a diagram showing a configurational example of a data identifying and reproducing unit according to a third embodiment.

FIG. 8 is a diagram showing a configurational example of a data identifying and reproducing unit 12b of the OLT according to a third embodiment of the present invention. The configuration of the OLT according to the present embodiment is identical to that of the OLT 1 of the first embodiment, except for including the data identifying and reproducing unit 12*b* instead of the data identifying and reproducing unit 12 of the OLT 1 according to the first embodiment. The configuration of the PON system according to the present embodiment is identical to that of the PON system according to the first embodiment, except for including the OLT according to the present embodiment instead of the OLT 1 according to the first embodiment. As shown in FIG. 8, the data identifying and reproducing unit 12*b* according to the present embodiment is identical to the data identifying and reproducing unit 12 according to the first embodiment, except for adding a transmission-rate determination unit 26. Constituent elements having functions identical to those in the first embodiment are denoted by like reference signs and explanations thereof will be omitted.

In the first embodiment, the transmission rate is acquired by acquiring the data signal information from the MAC processing unit 14. In the present embodiment, the transmission rate is not acquired from outside, but the transmission-rate determination unit 26 estimates the transmission rate based on the received signal to acquire a transmission rate. In the present embodiment, the data signal information is acquired from the MAC processing unit 14, but the data signal information is arranged to include a start timing of a data signal (burst signal) transmitted in one transmission-permitted time window, and the transmission rate may not be included in the data signal information. That is, in the present embodiment, even if the OLT 1 does not grasp the transmission rate transmitted from each ONU, data reproduction and identification can be performed. The start timing of the data signal is acquired by the MAC processing unit 14 based on the transmission timing of each ONU and the transmission time from each ONU to the OLT 1.

In the present embodiment, the data-signal-information acquisition unit 23 acquires the start timing of the data signal (a start time point of a time window in which transmission is permitted to the ONU) as the data signal information. The data-signal-information acquisition unit 23 notifies the sampling-clock control unit 22 of the data signal information. At the data start timing, the sampling-clock control unit 22 sets 2-Gbps, which is the highest transmission rate of the possible transmission rates, as an initial transmission rate, and selects the 6-GHz clock generation unit 33 that generates the oversampling frequency corresponding to the initial transmission rate. Subsequently, the sampling-clock control unit 22 instructs the 6-GHz clock generation unit 33 to start up, instructs the 3-GHz clock generation unit 32 to stop its operation, and instructs the sampling-clock selection unit 31 to output the sampling clock inputted from the 6-GHz clock generation unit 33.

When the start timing of the data signal comes and then reception of the data signal is actually started, the oversampling unit 24 performs oversampling of the received data signal using the sampling clock inputted from the sampling-clock selection unit 31, and outputs a sampling result to the reproduction-data selection unit 25 and the transmission-rate determination unit 26.

The transmission-rate determination unit 26 obtains a changing point in the data signal based on the input sampling result, and determines a transmission rate based on the information of the obtained changing point, and outputs the determined transmission rate to the data-signal-information acquisition unit 23. As a determination method of the transmission rate based on the received signal (sampling result), any method may be used. For example, the following method is used.

It is assumed that, when either 1-Gbps signal or 2-Gbps signal may be inputted, oversampling is performed using the sampling clock of 6 GHz. In this case, when the transmission rate of the received signal is 2 Gbps, as shown in FIG. 3, when a changing point (from HI to LOW or from LOW to HI) is detected, there are three sampling points between the changing points. On the other hand, when the transmission rate of the received signal is 1 Gbps, there are six sampling points between the changing points. Accordingly, the transmission rate can be estimated (determined) based on an interval between the changing points. For example, the interval between the changing points can be realized by a method of counting how many sampling points there are or a method of measuring a time interval between the changing points.

The data-signal-information acquisition unit 23 outputs the transmission rate inputted from the transmission-rate determination unit 26 to the sampling-clock control unit 22. Thereafter, selection of the clock generation unit and the data identification and reproduction process are performed in dependence upon the transmission rate similarly to the processes of Steps S12, S13 and S14 in the first embodiment. Operations other than those in the present embodiment described above are identical to corresponding ones of the first embodiment.

The data-signal-information acquisition unit 23 may acquire the data signal information including an end timing of the data signal. Similarly to the first embodiment, the sampling-clock control unit 22 may instruct the 3-GHz clock generation unit 32 and the 6-GHz clock generation unit 33 to stop their operations, and instruct the sampling-clock selection unit 31 to stop outputting a sampling clock, with setting the transmission rate to 0 Gbps during a period between the end timing of the data signal and the start timing of the next data signal.

In the present embodiment, while the start timing of the data signal is acquired from the MAC processing unit 14, the start timing may be estimated based on the received signal without acquiring the start timing from the MAC processing unit 14. For example, the estimation of the start timing is performed by the following method.

It is assumed that the transmission rate other than the fastest transmission rate of the possible transmission rates is substantially an integral submultiple of the fastest transmission rate. When reception of one bunch of data signals is complete, the sampling-clock control unit 22 selects the clock generation unit corresponding to the fastest transmission rate (the 6-GHz clock generation unit 33 in an example of FIG. 8). While the data signal is being inputted to the data identifying and reproducing unit 12*b*, even if the changing point in the sampling result is being detected continuously over a certain period of time, there is a sampling sequence, which does not approach the changing point, as #1 in an example of FIG. 3. That is, even if the changing point is being detected continuously over a certain period of time, there is a sampling sequence that does not become the changing point.

On the other hand, while the data signal is not being inputted thereto, a signal inputted to the data identifying and reproducing unit 12*b* is noise, and thus such a regular tendency is not observed. That is, if the changing point is being detected continuously over a certain period of time, a sampling sequence can not be an unchanging point (that is, not a changing point) continuously for all the sampling sequences. Accordingly, if a changing point is continuously detected over a certain period of time and a sampling sequence that does not become a changing point appears, it is determined to be a start of a data signal. On the other hand, when a sampling sequence that has not been a changing point becomes a changing point in turn, it can be determined to be the end of a data signal. In the PON system, the head of the data signal is a pattern for achieving synchronization and is not transmission data that serves as information to be transmitted. For this reason, this determination suffices only until transmission of the transmission data is started.

As described above, in the present embodiment, the transmission-rate determination unit 26 is provided in addition to the data identifying and reproducing unit 12 according to the first embodiment, so that the transmission-rate determination unit 26 determines the transmission rate based on the sampling result, and the sampling clock having the highest frequency of the possible sampling clocks is used until the transmission rate is determined. Therefore, in the present embodiment, effects identical to those of the first embodiment can be acquired, and the input signal from the MAC processing unit 14 can be reduced as compared to the first embodiment. Even if the transmission rate can not be acquired from the MAC processing unit 14 for some reasons, the transmission-rate determination unit 26 determines the transmission rate, thereby enabling to exert effects identical to those of the first embodiment.

Fourth embodiment.

Figure 9:
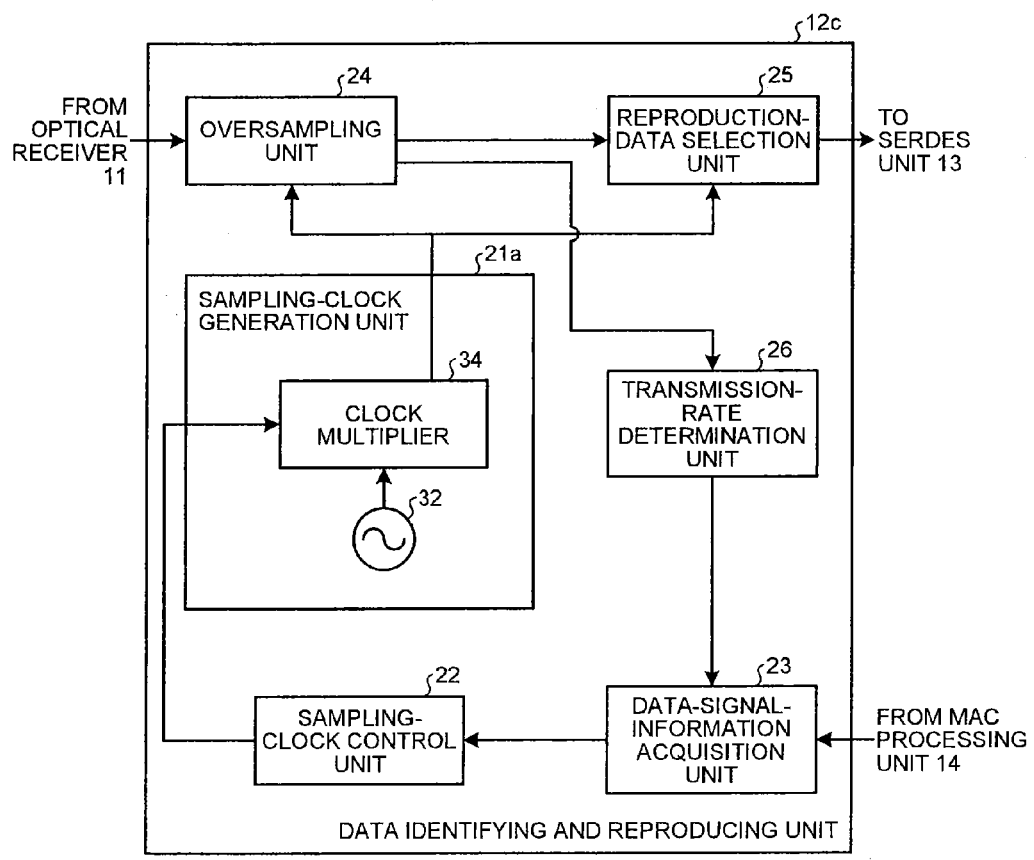
FIG. 9 is a diagram showing a configurational example of a data identifying and reproducing unit according to a fourth embodiment.

FIG. 9 is a diagram showing a configurational example of a data identifying and reproducing unit 12c of the OLT according to a fourth embodiment of the present invention. The configuration of the OLT according to the present embodiment is identical to that of the OLT according to the second embodiment, except for including the data identifying and reproducing unit 12c instead of the data identifying and reproducing unit 12a of the OLT according to the second embodiment. The configuration of the PON system according to the present embodiment is identical to that of the PON system of the first embodiment, except for including the OLT according to the present embodiment instead of the OLT 1 according to the first embodiment. As shown in FIG. 9, the data identifying and reproducing unit 12c according to the present embodiment is identical to that of the data identifying and reproducing unit 12a according to the second embodiment, except for adding the transmission-rate determination unit 26 similarly to the third embodiment. Constituent elements having functions identical to those in the second or third embodiment are denoted by like reference signs as those in the first embodiment and explanations thereof will be omitted.

In the present embodiment, a single sampling clock source is provided as with the second embodiment, and when the sampling clock is multiplied and used based on the transmission rate, the transmission-rate determination unit 26 obtains the transmission rate based on the sampling result as with the third embodiment.

In the present embodiment, similarly to the third embodiment, the data-signal-information acquisition unit 23 acquires the start timing of a data signal as the data signal information. The data-signal-information acquisition unit 23 notifies the sampling-clock control unit 22 of the data signal information. At the start timing of the data, the sampling-clock control unit 22 sets 2 Gbps that is the highest transmission rate of the possible transmission rates, as an initial transmission rate, and obtains a ratio between the oversampling frequency of 6 GHz corresponding to the initial transmission rate and the lowest sampling frequency as the multiplication rate (in this case, 2). The sampling-clock control unit 22 then notifies the clock multiplier 34 of the multiplication rate.

When it becomes the start timing of the data signal and then reception of the data signal is actually started, the oversampling unit 24 performs oversampling of the received data signal using the sampling clock inputted from the sampling-clock selection unit 31, and outputs a sampling result to the reproduction-data selection unit 25 and the transmission-rate determination unit 26. Similarly to the third embodiment, the transmission-rate determination unit 26 determines the transmission rate based on the sampling result, and notifies the determined result to the data-signal-information acquisition unit 23. Thereafter, determination of the oversampling frequency, determination of the multiplication rate, and a data identification and reproduction process are performed based on the transmission rate, similarly to Steps S22, S23 and S24 in the second embodiment. Operations other than those in the present embodiment described above are identical to corresponding ones of the second or third embodiment.

In the present embodiment, the start timing of the data signal is acquired from the MAC processing unit 14, but the start timing may be estimated based on the sampling result similarly to the third embodiment.

In the present embodiment, the transmission-rate determination unit 26 is provided in addition to the data identifying and reproducing unit 12a according to the second embodiment so that the transmission-rate determination unit 26 determines the transmission rate based on the sampling result, and the sampling clock having the highest frequency of the possible sampling clocks is used until the transmission rate is determined. Therefore, in the present embodiment, effects identical to those of the second embodiment can be acquired, and the input signal from the MAC processing unit 14 can be reduced as compared to the second embodiment. Even if the transmission rate can not be acquired from the MAC processing unit 14 for some reasons, the transmission-rate determination unit 26 determines the transmission rate, thereby enabling to exert effects identical to those of the first embodiment.

Industrial Applicability

As described above, the receiver, the data identifying and reproducing apparatus, the PON system and the data identifying and reproducing method according to the present invention are useful for a PON system using a plurality of transmission rates in a mixed manner, and are particularly suitable for a PON system aiming to achieve reduction of power consumption.

REFERENCE SIGNS LIST

1 OLT
2-1, 2-2 ONU
3 optical fiber
4 optical coupler
11 optical receiver
12 data identifying and reproducing unit
13 SERDES unit
14 MAC processing unit
21 sampling-clock generation unit
22 sampling-clock control unit
23 data-signal-information acquisition unit
24 oversampling unit
25 reproduction-data selection unit
26 transmission-rate determination unit
31 sampling-clock selection unit
32 3-GHz clock generation unit
33 6-GHz clock generation unit
34 clock multiplier

The invention claimed is:

1. A receiver that receives time-division multiplexed transmission signals having a plurality of transmission rates as a received signal, and performs data identification and reproduction by selecting reproduction data to be reproduced, among oversampled signals obtained by oversampling the received signal, the receiver comprising:
- a transmission-rate acquisition unit that acquires a transmission rate of a next time slot of a received signal targeted for a process of the data identification and reproduction;
- a sampling-frequency control unit that determines a sampling frequency to be used for the oversampling based on the transmission rate acquired for the next time slot;
- a sampling-clock generation unit that, upon a change to the next time slot, generates a clock signal having the sampling frequency determined by the sampling-frequency control unit; and
- an oversampling unit that performs the oversampling based on the clock signal.

2. The receiver according to claim 1, wherein
the transmission-rate acquisition unit acquires a transmission rate for each allocated time slot in a received signal in which burst signals having the plurality of transmission rates are time-division multiplexed, and
the sampling-frequency control unit determines a sampling frequency of each burst signal for each of the allocated time slots.

3. The receiver according to claim 1, further comprising a timing control unit that determines a transmission timing of the transmission signal in a transmission source apparatus and acquires a transmission rate of the transmission signal from the transmission source apparatus, wherein
the transmission-rate acquisition unit acquires the transmission rate from the timing control unit.

4. The receiver according to claim 1, wherein the transmission-rate acquisition unit acquires a transmission rate of the received signal based on the oversampled signal corresponding to the received signal targeted for a process of the data identification and reproduction.

5. The receiver according to claim 4, wherein the sampling-frequency control unit determines to use a predetermined frequency as the sampling frequency at the time of reception start of the received signal, and when a transmission rate is acquired in the transmission-rate acquisition unit, determines the sampling frequency based on the acquired transmission rate.

6. The receiver according to claim 1, wherein
the sampling-clock generation unit includes
a plurality of clock generation units that each generate a clock signal having a sampling frequency corresponding to the transmission rate, and
a sampling-clock selection unit that selects a clock signal to be outputted, among the clock signals outputted from the clock generation units based on the sampling frequency determined by the sampling-frequency control unit.

7. The receiver according to claim 6, wherein
the sampling-clock selection unit selects a clock generating unit from among the plurality of clock generation units, that generates a clock signal having the sampling frequency determined by the sampling-frequency control unit, and outputs the clock signal generated by the selected clock generation unit, and
the sampling-frequency control unit causes the other clock generation unit generating a clock signal having a frequency different from the determined sampling-frequency to stop operation thereof.

8. The receiver according to claim 1, wherein
the sampling-frequency control unit obtains a ratio of the determined sampling frequency to a sampling frequency corresponding to a smallest transmission rate of the transmission rates as a multiplication rate, and
the sampling-clock generation unit includes
a clock generation unit that generates a clock signal having a sampling frequency corresponding to the smallest transmission rate of the transmission rates, and
a clock multiplier that frequency-multiplies the clock signal outputted from the clock generation unit based on the multiplication rate determined by the sampling-frequency control unit.

9. The receiver according to claim 1, wherein the sampling-frequency control unit determines the sampling frequency based also on a jitter amount of the received signal.

10. A data identifying and reproducing apparatus that receives time-division multiplexed transmission signals having a plurality of transmission rates as a received signal, and performs data identification and reproduction by selecting reproduction data to be reproduced, among oversampled signals obtained by oversampling the received signal, the data identifying and reproducing apparatus comprising
- a transmission-rate acquisition unit that acquires a transmission rate of a next time slot of a received signal targeted for a process of the data identification and reproduction;
- a sampling-frequency control unit that determines a sampling frequency to be used for the oversampling based on the transmission rate acquired for the next time slot;
- a sampling-clock generation unit that, upon a change to the next time slot, generates a clock signal having the sampling frequency determined by the sampling-frequency control unit; and
- an oversampling unit that performs the oversampling based on the clock signal.

11. A PON system comprising a subscriber side device, and a station side device that receives time-division multiplexed transmission signals having a plurality of transmission rates, which is transmitted from the subscriber side device, as a received signal, and performs data identification and reproduction by selecting reproduction data to be reproduced, among oversampled signals obtained by oversampling the received signal, wherein the station side device includes
- a transmission-rate acquisition unit that acquires a transmission rate of a next time slot of a received signal targeted for a process of the data identification and reproduction,
- a sampling-frequency control unit that determines a sampling frequency to be used for the oversampling based on the transmission rate acquired for the next time slot,
- a sampling-clock generation unit that, upon a change to the next time slot, generates a clock signal having the sampling frequency determined by the sampling-frequency control unit, and
- an oversampling unit that performs the oversampling based on the clock signal.

12. A data identifying and reproducing method in a receiver that receives time-division multiplexed transmission signals having a plurality of transmission rates as a received signal, and performs data identification and reproduction by selecting reproduction data to be reproduced, among oversampled signals obtained by oversampling the received signal, the method comprising:
- acquiring a transmission rate of a next time slot of a received signal targeted for a process of the data identification and reproduction;
- determining a sampling frequency to be used for the oversampling based on the transmission rate acquired for the next time slot;
- generating upon a change to the next time slot a clock signal having the sampling frequency determined; and
- performing the oversampling based on the clock signal.

* * * * *